Figure 1:
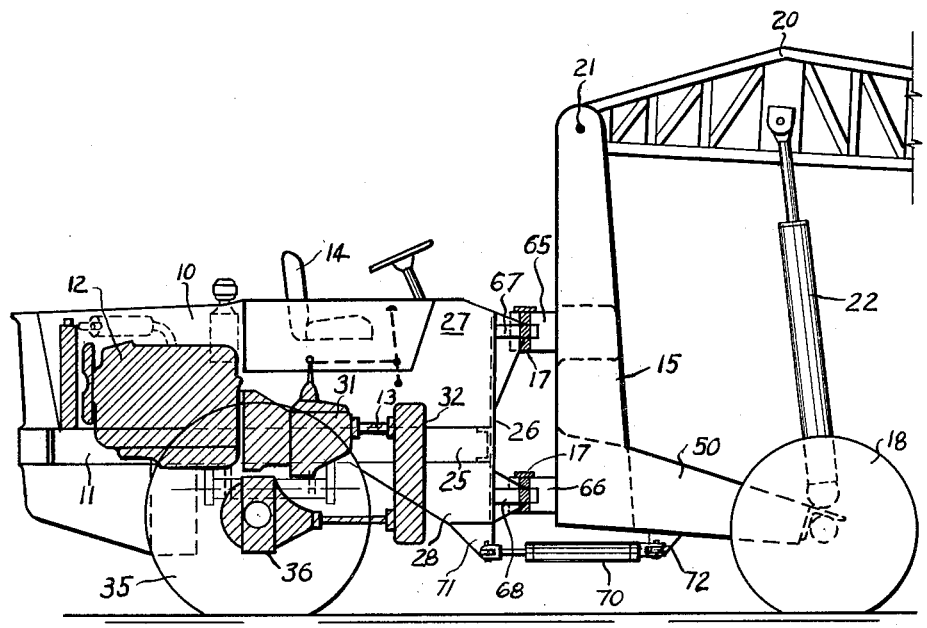

March 3, 1964  F. S. LIVINGSTON ET AL  3,123,222
MOBILE CRANES, HOISTS AND THE LIKE
Filed Sept. 22, 1961  4 Sheets-Sheet 1

Inventors
Frank Stephen Livingston
Ronald Joseph Earney
Kenneth Evans

Atty

March 3, 1964     F. S. LIVINGSTON ET AL     3,123,222
MOBILE CRANES, HOISTS AND THE LIKE
Filed Sept. 22, 1961     4 Sheets-Sheet 3

Inventors
Frank Stephen Livingston
Ronald Joseph Earney
Kenneth Evans
Paul O. Pippel
Atty.

March 3, 1964 F. S. LIVINGSTON ET AL 3,123,222
MOBILE CRANES, HOISTS AND THE LIKE
Filed Sept. 22, 1961 4 Sheets-Sheet 4

Inventors
Frank Stephen Livingston
Ronald Joseph Earney
Kenneth Evans
Paul O. Pippel Atty

United States Patent Office 3,123,222
Patented Mar. 3, 1964

3,123,222
MOBILE CRANES, HOISTS AND THE LIKE
Frank Stephen Livingston, Rosanna, Victoria, Ronald Joseph Earney, Belmont, Geelong, Victoria, and Kenneth Evans, North Croydon, Victoria, all of Australia, assignors to International Harvester Company, Chicago, Ill., a corporation of New Jersey
Filed Sept. 22, 1961, Ser. No. 140,123
Claims priority, application Australia Sept. 26, 1960
1 Claim. (Cl. 212—39)

This invention relates to power actuated load lifting and transporting vehicles such as mobile cranes, hoists or shovels of the type in which a power motivated vehicle carries power actuated jib shovel, platform or the like for lifting and transporting a load. Mobile cranes and shovels are now extensively used in various industries in which the working or operating conditions vary to a very material extent and introduce such factors as irregularity in level or contour of the surface being traversed particularly in road and building construction.

Under such working conditions the stabilizing of the vehicle during operation i.e. whilst load lifting or traversing uneven terrain is essential, but has not always been achieved efficiently by the mobile cranes at present employed.

It is also desirable that a degree of angular freedom in the vertical plane be provided within the axle mounting arrangements to ensure that loadings applied to individual wheels on the driving axle will be substantially equalised and resultantly maximum traction will be achievable under a wide range of conditions.

In most known machines the driving axle is rigidly connected to a chassis supporting the power unit and the operative, and a jib or shovel is carried by a frame mounted on a pair of wheels and connected to the chassis for angular movement relative thereto about a horizontal axis. Thus when traversing uneven terrain causing angular movement between the chassis and the jib or shovel, the operative moves with the chassis.

Such an arrangement has obvious disadvantages from the aspect of safety, as the centre of gravity of the jib and associated frame is high in comparison with that of the chassis, and therefore the inclination of the former has primary influence on the stability of the crane. Accordingly, the operative would have better "feel" of the crane and be able to sense more accurately when it was approaching its critical inclination if his body moved with the jib.

It is thus the principal objective of the instant invention to provide an effective power operated load lifting and transporting vehicle having a simplified construction, with attendant cost reduction, and including simple safe and effective means for permitting the relative movements between the wheels and chassis and or lifting structure generally to positively stabilize the vehicle over a wide range of operative or working conditions.

It is a further objective of the invention to provide such an effective mobile crane including simplified vehicles, wheel and axle mounting to permit cross oscillation of the vehicle, and a considerably simplified jib support and coupling to said vehicle for efficient and conveniently controllable slewing and steering movements for the crane.

With the above stated principal object in view there is provided according to the present invention a power operated load lifting and transporting vehicle comprising a prime mover having a pair of driven transport wheels mounted for relative angular movement about a longitudinal axis, a support frame carried by a pair of transport wheels and pivotally connected to the prime mover for relative angular movement about a vertical axis, means carried by said support frame for lifting the load, and means operable at will to control the angular disposition of the support frame relative to the prime mover to effect steering of the vehicle when the latter is in motion and slewing or swinging of the support frame when the vehicle is stationary.

More specifically there is provided a power operated load lifting and transporting vehicle comprising a main frame, a driving engine carried by said main frame, a pair of transport wheels pivotally connected to said main frame for relative angular movement in unison about a longitudinal axis and drive coupled to said engine, a jib frame supported at the forward end by a pair of transport wheels and pivotally connected at the rear end to the main frame for relative angular movement about a vertical axis, a jib carried by and projecting forwardly from the jib frame, and means operable at will to control the relative angular disposition of said jib frame relative to the main frame to effect steering of the vehicle when the latter is in motion, and slewing of the jib when the vehicle is stationary.

Conveniently the jib frame comprises a pair of substantially L shaped laterally spaced members interconnected by a cross beam adjacent the lower end of the upright sections thereof.

Upper and lower vertically aligining yoke brackets are provided on the cross beam and are connected to complementary brackets on the main frame by pivot or hinge pins. The outer "toe" end of the L shaped member is supported by the transport wheels.

The driving wheels are mounted in a cradle or sub frame which is connected by central longitudinal pivot pin to brackets projecting downwardly from the main frame.

With the crane constructed with the above pivot arrangement, it is possible to locate the longitudinal pivot pin at a point where the bending moment is a minimum without incurring structural complications and thus achieving simplicity and economy in production.

Furthermore since the main frame upon which the operative seat oscillates in unison with the jib about the horizontal axis, the operative is afforded the ability to sense the degree of tilt of the jib due to obstructions or ground slope with a resultant increase in safety.

The invention will be more readily understood from the following description of one practical arrangement of the crane illustrated in the accompanying drawings.

Figure 2:
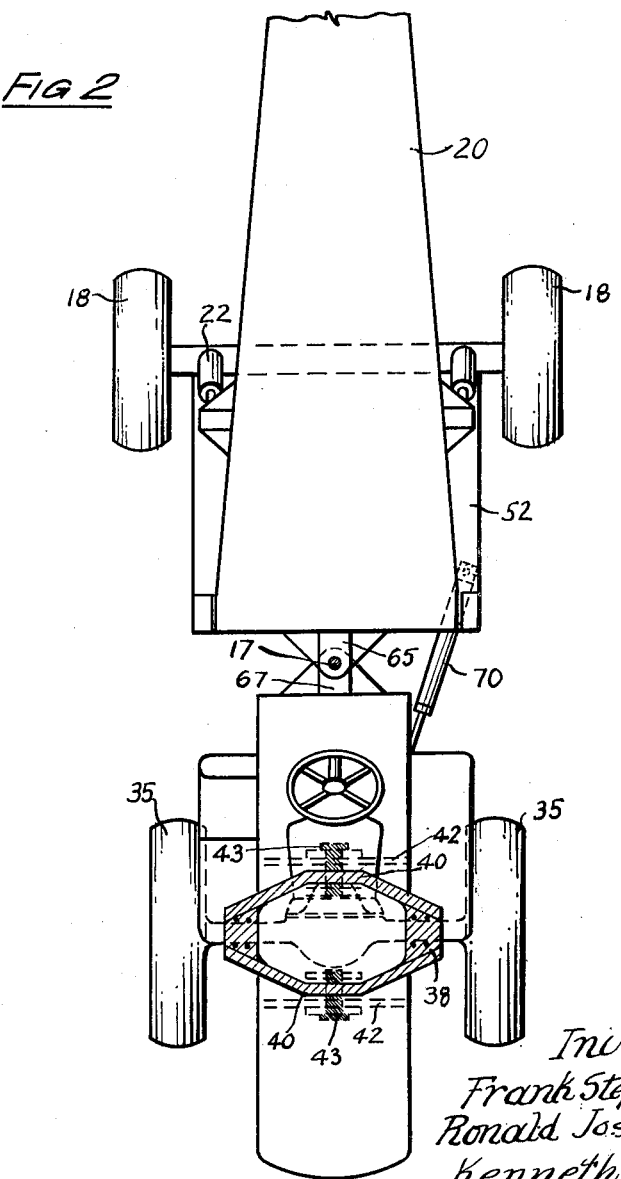
Figure 3:
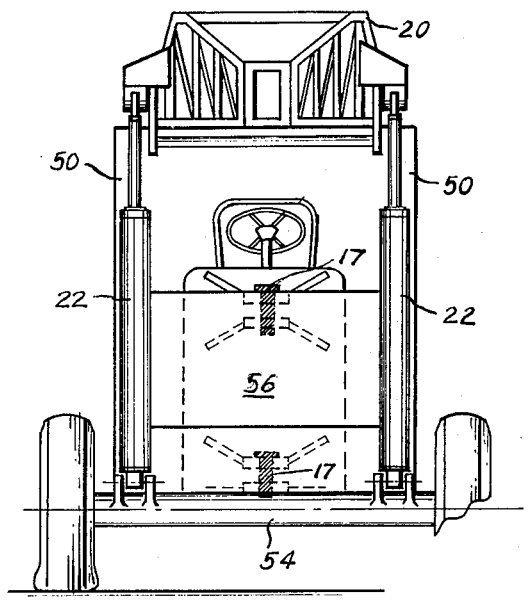
Figure 4:
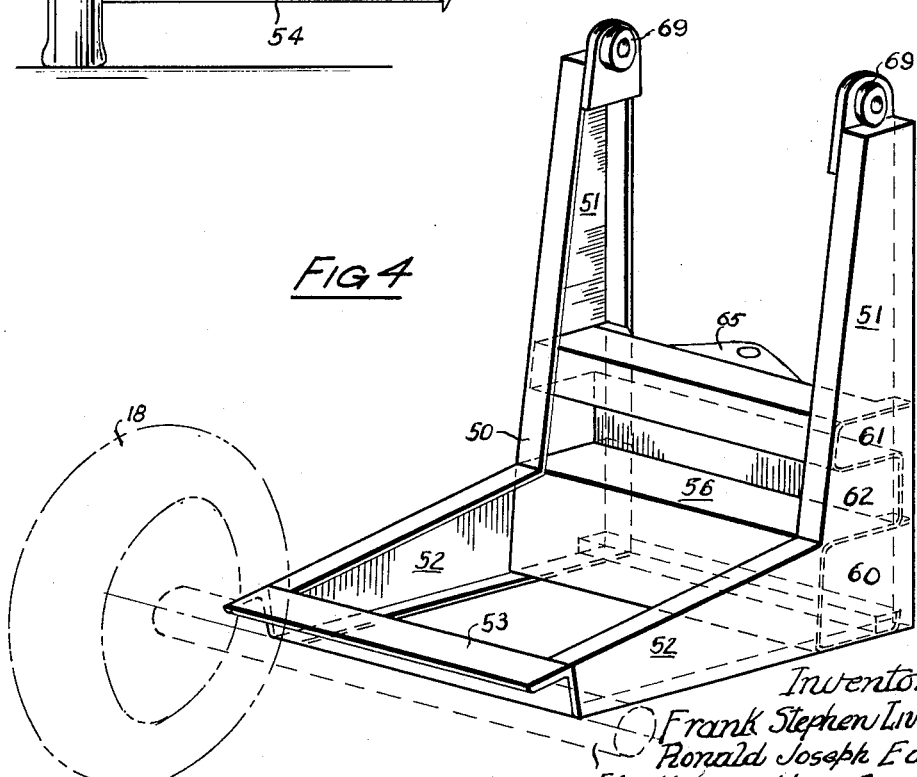
Figure 5:
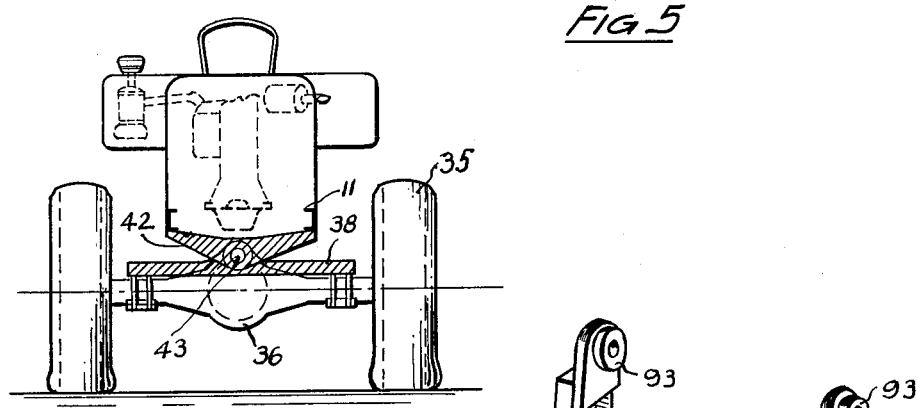
Figure 6:
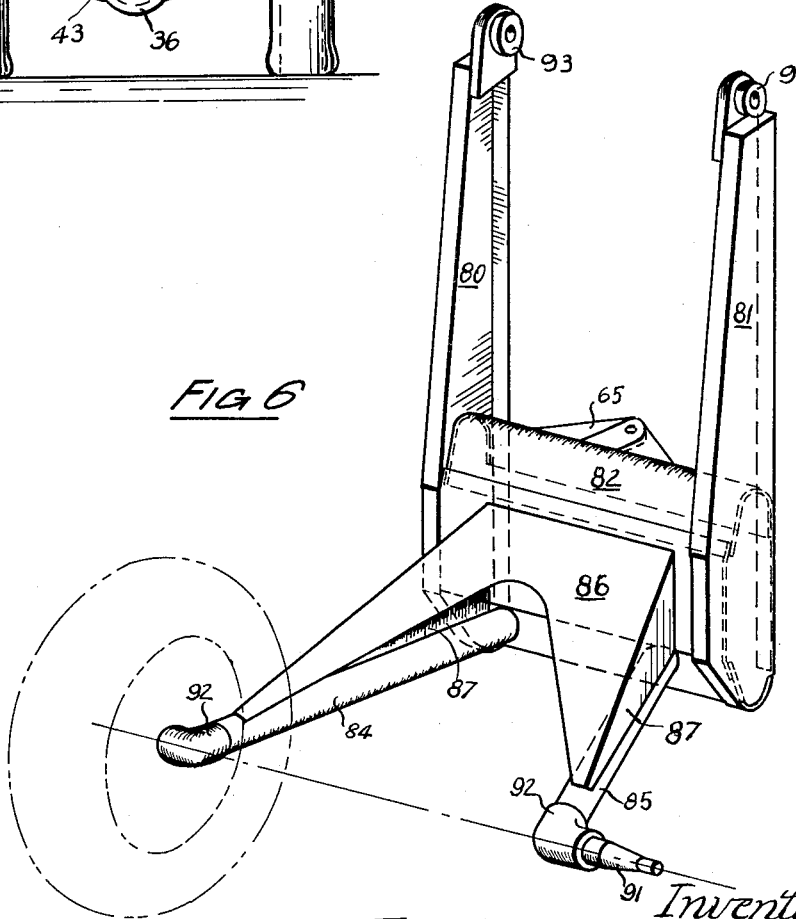

In the drawings:
FIGURE 1 is a side elevation of the crane with portion of the jib removed.
FIGURE 2 is a plan view of the crane shown in FIGURE 1.
FIGURE 3 is a front elevation of the crane.
FIGURE 4 is a perspective view of the jib frame.
FIGURE 5 is a rear elevation of the crane with the jib and jib frame removed.
FIGURE 6 is a perspective view of a modified form of the jib frame.

Referring now to FIG. 1 of the drawings, the tractor or prime mover unit 10 comprises a main frame 11 supporting the engine 12, drive transmission 13 and drivers seat 14. The L shaped jib frame 15 is pivotally connected to the forward end of the main frame 11 by the vertically aligning pins 17 and is supported at the forward end by the pair of transport wheels 18.

The jib 20 is pivotally connected by shaft 21 to the upper end of the jib frame 15 and the pair of hydraulic cylinders 22 connected between the respective lower arms of the jib frame 15 and the jib effect raising and lowering of the latter.

The main frame 11 comprises the generally rectangularly shaped chassis 25 made from rolled steel sections and the vertical front section 26 welded to the chassis 25 and reinforced by suitable gussets such as 27 and 28.

The engine 12, speed change gear box 31 and transfer box 32 are mounted in the chassis 25 in the conventional manner.

The driving wheels 35 are mounted upon a conventional differential type axle housing 36 and coupled through the differential to the transfer box 32. The axle housing 36 is attached adjacent the respective wheels 35 to a cradle or sub-frame 38. In plan view the sub-frame 38 is wider at the centre than each end, and at the widest point comprises two parallel sections 40 disposed forward and rearward respectively of the differential and transverse of the chassis 25. The sub-frame 38 is connected at the parallel sections 40 to respective transverse members 42 of the chassis by coaxial pins 43 disposed in the same vertical plane as the longitudinal axis of the tractor unit, as can be seen in FIGS. 2 and 5.

The jib frame 15 comprises two substantially L shaped plate members 50 each having an upright section 51 and a horizontal section 52. The forward ends of the horizontal sections 52 are connected by an angle iron member 53 forming a seating into which the axle 54 carrying the wheels 18 is clamped. The transverse spacing member 56 connects the lower portions of the upright sections 51 and comprises a pressing which provides upper and lower rearwardly open channel sections 60 and 61 and an integral central forwardly open channel section 62.

The upper and lower yokes 65 and 66 are welded in a central location to the transverse spacing member 56 and are provided with vertically aligning apertures. The centrally located vertical aligning brackets 67 and 68 on the front section 26 of the main frame 11 fit within the yokes 65 and 66 respectively, and separate pivot pins 17 pass therethrough to form the vertical pivot connection between the prime mover and the jib frame.

With the jib frame constructed in this manner there is a large clear space forward of the operator which provides an unobstructed view of the jib and any load being carried as can be seen in FIGURE 3.

The jib 20 is pivotally connected at the inner end to the transverse pivot spindle 21 journalled in the aligning bearings 69 mounted upon the upper ends of the vertical limbs of the L shaped member 50.

The jib 20 is actuated by the upright hydraulic power cylinders 22 each pivotally connected at the lower end to the angle iron member 53 and at the upper end to the jib. These power cylinders are operable in unison at will from the driver's seat.

Steering and slewing of the crane is effected by the selective operation of the hydraulic power cylinder 70, horizontally arranged and pivotally connected by respective vertical pivot pins to the bracket 71 fitted to the main frame 11 and the bracket 72 on the horizontal section 52 of one L shaped member 50.

FIGURE 6 shows a modified form of the jib frame which is of the basic L shape but incorporates separate stub axles for the wheels 18 so as to permit the lifting of heavy loads close to the inner end of the jib. This jib frame comprises a pair of upright members 80 and 81 connected at the lower end by the transverse member 82 of generally elliptical cross section fabricated from metal pressings.

A pair of tubular arms 84 and 85 are attached to the transverse member adjacent its lower edge and project forwardly therefrom in an outwardly splayed relation. The generally V shaped gusset 86 having vertical flanges 87 is connected between the tubular arms and the transverse member.

The stub axles 91 are provided with a hollow angular related portion 92 to fit over, and be welded to, the forward ends of the respective tubular arms.

Bearings 93 are provided at the top of each upright member 80 and 81 to receive the pivot spindle 21 supporting the jib 20.

A mobile crane constructed in the above described manner possesses the following advantages:

(1) Vertical oscillation of the driving axle about a longitudinal axis relative to the main frame is effected by a pivot connection located at the point of minimum bending moment without incurring structural complications, with attendant simplicity and economy in production.

(2) The feature of having the tractor operate without oscillating relative to the jib has two principal advantages over the mobile cranes at present in use.

(a) It is normal and logical to have the front wheel track as large as possible to enhance stability and for convenience and economy, to have the driving wheel track appreciably smaller. Furthermore, the larger the track the less is the tilt of the vehicle when passing over a given surface irregularity, thus pivoting of the narrow track axle for oscillation relative to main and jib frames as in the present invention, reduces angular displacement of the frames and results in improved operator comfort.

(b) Unlike conventional cranes, the angular movement of the operator's seat following the movement of the main frame and jib and affording the driver the ability to sense the degree by which the crane is being tilted due to obstructions or natural ground slope and promotes safer crane operation.

(3) The construction providing for crane slewing gives three principal advantages, viz.

(a) Because the operator is seated close to the vertical pivot and the jib, steering and slewing using the jib as a sighting reference will be a natural reaction. With present mobile cranes there is a considerable amount of the main frame forward of the vertical pivot which, on steering, is displaced in the opposite direction to the jib. Steering of such cranes is complicated by the diverging movement of these two components, as the reference point for operator control is confused. Consequently the steering of present cranes is an acquired skill rather than a natural reaction and the more natural movement of the proposed crane is an advantage, particularly as the construction of the jib frame promotes excellent forward visibility.

(b) Because the crane vertical pivot is positioned near to the central point of the wheelbase, tracking of the rear axle to the front axle during turning is at a near optimum condition. The front axle track, as above mentioned, is conventionally greater than the rear axle track and clearances established by the front wheels will be sufficient for passage of the rear wheels under the full range and steering conditions.

(c) The construction of the jib frame referred to above as L shaped ensures that in the event of the crane colliding with an obstruction or overturning due to malcontrol the operator is protected to the maximum degree by the massive vertical arms of the jib frame.

(4) The hydraulic steering cylinder, being fixed to one arm of the L shaped jib frame and to the front section of the prime mover, and freedom of relative movement between these two units being restricted to articulation about the vertical axis it is possible to position the cylinder so that there is no requirement to provide universal angular freedom at the cylinder attaching points.

Although the preceding description is directed specifically to a mobile crane it is to be understood that the same basic construction of the vehicle can be used for other load lifting and transporting vehicles such as power shovels and fork lift trucks.

We claim:

A power operated load lifting and transporting vehicle comprising;

(a) a prime mover including a first frame, (b) a power unit supported on said first frame, (c) a sub frame, (d) means pivotally connecting said sub frame to said first frame for pivotal movement about a longitudinal axis,
(e) power transmission means on said sub frame,
(f) driven ground wheel connected to said power transmission means to be driven thereby,
(g) means operatively connecting said power unit and said power transmission means,
(h) an operator's station on said first frame positioned forwardly of said power unit,
(i) a second frame, said second frame having an L-shaped configuration including,
(j) an upright support and a horizontal support extending forwardly with respect to said first frame,
(k) a pair of ground wheels connected to said second frame for supporting the same, said ground wheels of said second frame having a wider over-all spacing dimension than said driven wheels of said first frame,
(l) vertical pivot means connecting said upright support providing for relative angular movement of said frame about a vertical pivot axis,
(m) fluid acuated steering means connected between said frames for moving the same angularly,
(n) a jib pivotally connected to said upright support, and
(o) means on said second frame connected to said jib for raising and lowering the same.

References Cited in the file of this patent
UNITED STATES PATENTS

| | | |
|---|---|---|
| 1,559,880 | Ionides | Nov. 3, 1925 |
| 2,363,341 | Lawler | Nov. 21, 1944 |
| 2,393,916 | Lawler | Jan. 29, 1946 |
| 2,557,513 | Quartullo | June 19, 1951 |
| 2,627,983 | Lathers | Feb. 10, 1953 |
| 2,741,373 | Edgar | Apr. 10, 1956 |
| 2,782,939 | Bernaerts | Feb. 26, 1957 |
| 3,049,186 | Garrett | Aug. 14, 1962 |